(12) United States Patent
Udd et al.

(10) Patent No.: US 6,335,524 B1
(45) Date of Patent: Jan. 1, 2002

(54) HIGH SPEED DEMODULATION SYSTEMS FOR FIBER OPTIC GRATING SENSORS

(75) Inventors: Eric Udd, Fairview; Andreas Weisshaar, Corvallis, both of OR (US)

(73) Assignee: Blue Road Research

(*) Notice: Subject to any disclaimer, the term of this patent is extended or adjusted under 35 U.S.C. 154(b) by 0 days.

(21) Appl. No.: 09/176,515

(22) Filed: Oct. 21, 1998

Related U.S. Application Data

(60) Provisional application No. 60/062,629, filed on Oct. 22, 1997.

(51) Int. Cl.[7] .............................. G01B 11/16; G01S 9/02
(52) U.S. Cl. .............................. 250/227.18; 250/227.14; 356/32
(58) Field of Search .......... 250/227.14, 227.17–227.19, 250/227.23; 356/32, 35.5, 345; 73/800; 385/37

(56) References Cited

U.S. PATENT DOCUMENTS

| | | | |
|---|---|---|---|
| 5,380,995 A | 1/1995 | Udd et al. | |
| 5,397,891 A | 3/1995 | Udd et al. | |
| 5,399,854 A | 3/1995 | Dunphy et al. | |
| 5,591,965 A | 1/1997 | Udd | |
| 5,646,401 A | 7/1997 | Udd | |
| 5,675,674 A | * 10/1997 | Weis | 385/12 |
| 5,828,059 A | 10/1998 | Udd | |
| 5,841,131 A | 11/1998 | Schroeder et al. | |
| 5,869,835 A | * 2/1999 | Udd | 250/227.18 |

OTHER PUBLICATIONS

M.C. Xu, H. Geiger and J.P. Dakin, "Multiplayed Stepwise Continuous Fibre Grating Based Sensors: Practical Sensors for Structural Monitoring 7, ", Proceedings of SPIE, vol. 2294, p. 69, 1994.

M.G. Xu, J. L. Avchambault, L. Reekie and J.P. Dakin, "Discrimination Between Strain and Temperature Using Dual Wavelength Fibre Grating Sensors", Electronics Letters, vol. 30, p. 1085, 1994.

* cited by examiner

Primary Examiner—Stephone B. Allen
(74) Attorney, Agent, or Firm—George W. Finch

(57) ABSTRACT

Fiber optic grating sensor demodulation systems are described that offer high speed and multiplexing options for both single and multiple parameter fiber optic grating sensors. To attain very high speeds for single parameter fiber grating sensors ratio techniques are used that allow a series of sensors to be placed in a single fiber while retaining high speed capability. These methods can be extended to multiparameter fiber grating sensors. Optimization of speeds can be obtained by minimizing the number of spectral peaks that must be processed and it is shown that two or three spectral peak measurements may in specific multiparameter applications offer comparable or better performance than processing four spectral peaks. Combining the ratio methods with minimization of peak measurements allows very high speed measurement of such important environmental effects as transverse strain and pressure.

15 Claims, 13 Drawing Sheets

3M fiber $$K = \begin{bmatrix} 807 & -302 & -626 & 10,229 \\ 711 & -897 & -561 & 10,600 \\ 980 & -370 & -742 & 12,186 \\ 900 & -963 & -587 & 12,081 \end{bmatrix} \times 10^{-6}$$

Fig. 14A

Fibercore fiber $$K = \begin{bmatrix} 728 & -674 & -653 & 13,019 \\ 623 & -1,560 & -425 & 11,355 \\ 859 & -840 & -836 & 17,438 \\ 758 & -1,859 & -494 & 15,364 \end{bmatrix} \times 10^{-6}$$

Fig. 14B 3M fiber

| SENSOR RESPONSE | $\Delta\varepsilon_1(\mu\varepsilon)$ | $\Delta(\Delta T)$ (°C) |
|---|---|---|
| 1p + 1q | 78 | 7.5 |
| 2p + 2q | 111 | 11 |
| 1p + 2p | 110 | 11 |
| 1p + 2q | 58 | 5.7 |
| 1q + 2p | 43 | 4.2 |
| 1q + 2q | 32 | 3.1 |
| 1p,q + 2p,q | 38 | 3.7 |

Fig. 15A

Fibercore fiber

| SENSOR RESPONSE | $\Delta\varepsilon_1(\mu\varepsilon)$ | $\Delta(\Delta T)$ (°C) |
|---|---|---|
| 1p + 1q | 12.2 | 1.0 |
| 2p + 2q | 10.7 | 0.8 |
| 1p + 2p | 17.2 | 1.2 |
| 1p + 2q | 39.0 | 3.1 |
| 1q + 2p | 6.8 | 0.5 |
| 1q + 2q | 15.5 | 1.3 |
| 1p,q + 2p,q | 7.7 | 0.6 |

Fig. 15B 3M fiber

| SENSOR RESPONSE | $\Delta\varepsilon_1(\mu\varepsilon)$ | $\Delta\varepsilon_2(\mu\varepsilon)$ | $\Delta\varepsilon_3(\mu\varepsilon)$ |
|---|---|---|---|
| 1p + 1q + 2p | 92 | 4.8 | 121 |
| 1p + 1q +2q | 13.5 | 3.0 | 18.5 |
| 1p + 2p +2q | 105 | 22 | 126 |
| 1p + 2p +2q | 13.5 | 2.8 | 18.7 |
| 1p,q + 2p,q | 14.8 | 2.9 | 18.6 |

Fig. 16A

Fibercore fiber

| SENSOR RESPONSE | $\Delta\varepsilon_1(\mu\varepsilon)$ | $\Delta\varepsilon_2(\mu\varepsilon)$ | $\Delta\varepsilon_3(\mu\varepsilon)$ |
|---|---|---|---|
| 1p + 1q + 2p | 33.1 | 5.9 | 30.5 |
| 1p + 1q +2q | 75.2 | 11.5 | 72.7 |
| 1p + 2p +2q | 33.3 | 6.5 | 29.9 |
| 1p + 2p +2q | 79.4 | 14.4 | 67.8 |
| 1p,q + 2p,q | 39.7 | 6.4 | 35.8 |

Fig. 16B 3M fiber

| SENSOR RESPONSE | $\Delta\varepsilon_1(\mu\varepsilon)$ | $\Delta\varepsilon_2 = \Delta\varepsilon_3(\mu\varepsilon)$ |
|---|---|---|
| 1p + 1q | 4.6 | 2.9 |
| 2p + 2q | 5.1 | 3.6 |
| 1p + 2p | 169 | 148 |
| 1p + 2q | 6.0 | 4.1 |
| 1q + 2p | 4.0 | 2.6 |
| 1q + 2q | 14 | 7.7 |
| 1p,q + 2p,q | 4.6 | 3.1 |

Fig. 17A

Fibercore fiber

| SENSOR RESPONSE | $\Delta\varepsilon_1(\mu\varepsilon)$ | $\Delta\varepsilon_2 = \Delta\varepsilon_3(\mu\varepsilon)$ |
|---|---|---|
| 1p + 1q | 5.5 | 2.2 |
| 2p + 2q | 5.4 | 2.2 |
| 1p + 2p | 37 | 19.8 |
| 1p + 2q | 5.2 | 2.1 |
| 1q + 2p | 5.5 | 2.2 |
| 1q + 2q | 108 | 34.6 |
| 1p,q + 2p,q | 5.4 | 2.2 |

Fig. 17B

HIGH SPEED DEMODULATION SYSTEMS FOR FIBER OPTIC GRATING SENSORS

This application claims the benefit of U.S. Provisional Application Ser. No. 60/062,629 by Eric Udd, and Andreas Weisshaar, entitled "Techniques for Improved Demodulation of Dual Overlaid Fiber Gratings on Polarization Maintaining Fiber", which was filed Oct. 22, 1997.

This invention was made with government support under contract number NAS1-97003 awarded by NASA and contract DAAL01-98-C-0034 awarded by the Army. The US Government has certain rights to this invention.

BACKGROUND OF THE INVENTION

For many structural applications fiber gratings have been proposed as a method to measure strain. A great deal of work has been done investigating the usage of fiber gratings to measure axial strain and temperature. In many cases that involve embedment into a structure, the fiber grating is subject to transverse strain that may result in a spectral shift on the order of the spectral shifts resulting from longitudinal strain and or temperature shifts. E. Udd in U.S. Pat. No. 5,591,965, Jan. 7, 1997 describes a three axis strain and temperature fiber grating sensor formed by writing two overlaid fiber gratings onto birefringent fiber. As an example wavelengths of the fiber gratings can be written at 1.300 and 1.550 microns. By writing onto the highly birefringent fiber four gratings are established. In the case of about a two millimeter beat length at 630 nm they would be at 1300.0, 1300.6, 1550.0 and 1550.8 nm. The birefringent axes are well defined so that transverse strain can be measured along with longitudinal strain and temperature through four equations in four unknowns.

Further improvement in the measurement of transverse strain were made by E. Udd in the patent application Ser. No. 08/707,861, "Transverse Strain Measurements Using Fiber Optic Grating Based Sensors", filed Sep. 9, 1996.

For many applications it is desirable to be able to quickly and efficiently measure subsets of three axes of strain and temperature. An area that has been investigated closely is the measurement of longitudinal strain and temperature. M. G. Xu, H. Geiger and J. P. Dakin in "Multiplexed Point and Stepwise Continuous Fibre Grating Based Sensors: Practical Sensor for Structural Monitoring?", Proceedings of SPIE, Vol. 2294, p. 94, 1994 describe the usage of dual overlaid fiber gratings to measure strain and temperature. The major difficulty with this approach is that to obtain reasonable accuracy using conventional single mode fiber widely separated wavelengths must be used. In the case of the paper by Xu et. al 850 and 1300 nm edge light emitting diodes were used. These two wavelengths are far enough apart to have modest strain and temperature resolution but problems associated with bend loss and high attenuation in conventional fibers have severely limited the utility of this approach. What is needed is an approach that measures strain and temperature accurately using wavelengths that result in fibers supporting low loss and high bend resistance.

It is also important to be able to process information from multiparameter fiber grating sensors quickly and accurately. For many applications, notably including aircraft, missiles and spacecraft it is necessary to respond quickly and accurately to high speed events. Extremely high speed events are also of interest to perform diagnostics during ballistic tests, rocket motor firing and explosions. To support these measurements very high speed demodulation systems are required in some cases with frequency response on the order of 10s of MHz. In order to meet cost and performance goals it is also necessary to multiplex these devices.

High speed demodulation methods that allow multiparameter sensing to be accomplished while multiplexing significant numbers of fiber sensors along a single fiber are needed for these applications. Current demodulator systems are designed for modest speeds. Typical performance of fiber etalon based systems that are currently marketed by Research International and Micron Optics run at 50 to 200 Hz with sufficient resolution to support multiparameter sensing. Higher speed, single channel fiber grating demodulation systems are commercially available from Electrophotonics and Blue Road Research. The current models run at 5 to 7 kHz and are designed to monitor one single element fiber grating sensor severely limiting their ability to support multiparameter distributed sensing.

Systems are needed that support multiparameter sensing at much higher speeds while enabling multiplexing of fiber grating sensors along a single fiber line in significant numbers.

BRIEF DESCRIPTION OF THE PRESENT INVENTION

In the present invention high speed demodulation systems are described for supporting one or more fiber grating sensors that are subject to temperature, longitudinal strain, transverse strain or other environmental parameters that result in a change in their spectral response. This invention improves the accuracy and speed of measurements made on fiber grating sensors formed on birefringent optical fiber by identifying the minimal number of spectral peak positions that must be measured to insure an accurate result. For the case of dual wavelength fiber gratings written onto birefringent fiber this involves selecting two or three of the four possible spectral peaks to process to allow rapid measurement of axial strain and temperature, or pressure, or three axes of strain. Very high speed demodulation and multiplexed fiber grating sensor systems can be supported by employing ratiometric techniques that use chirped fiber gratings, overcoupled couplers or Mach-Zehnder or Michelson interferometers in combination with appropriately placed fiber grating filters. By combining these techniques it is possible to support very high speed multiparameter sensing using fiber gratings.

Therefore it is an object of the invention to provide high speed demodulation systems for fiber grating sensor systems.

Another object of the invention is to provide demodulation systems that are capable of supporting multiparameter sensing at higher speed.

Another object of the invention is to provide means to multiplex large numbers of fiber sensors for multiparameter and high speed sensing.

Another object of the invention is to provide higher speed performance while retaining the accuracy of measurements.

BRIEF DESCRIPTION OF THE DRAWINGS

FIG. 14a shows the experimentally determined K-matrix values for a 3M fiber which relate the three strain components and temperature change to the corresponding wavelength shift in the four observed peak position.

FIG. 14b shows the experimentally determined K-matrix values for a Fibercore fiber which relate the three strain components and temperature change to the corresponding wavelength shift in the four observed peak position.

FIGS. 15a,b are two tables showing how the maximum expected error for longitudinal strain can be reduced by processing information on the position of two of the spectral peaks associated with dual overlaid fiber grating written onto birefringent fiber in the case where measurement of temperature is also performed.

FIGS. 16a,b are two tables illustrating that the processing of three spectral peaks instead of four can be used to measure three axes of strain with comparable accuracy while increasing speed.

FIGS. 17a,b are two tables illustrating how for the case of axial strain and equal transverse strain (uniform pressure applied to the fiber as an example) two spectral peaks may be processed to give accuracy comparable to processing all four peaks.

DETAILED DESCRIPTION OF THE SHOWN EMBODIMENTS

Figure 1:
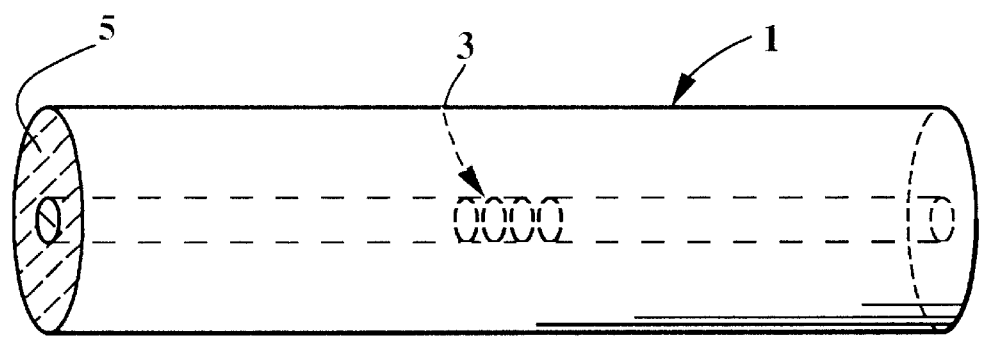
FIG. 1 is a diagram of a prior art fiber grating sensor based on writing a single grating onto optical fiber.
Figure 1A:
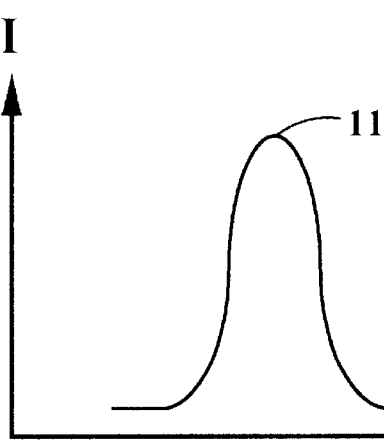
FIG. 1a is a diagram of the spectral reflective output from the sensor in FIG. 1.

FIG. 1 shows a prior art fiber grating sensor based on writing a single grating onto optical fiber. The fiber grating sensor 1 consists of fiber grating 3 written onto a length of optical fiber 5. FIG. 1a shows the spectral reflective output 11 from the sensor in FIG. 1.

Figure 2:
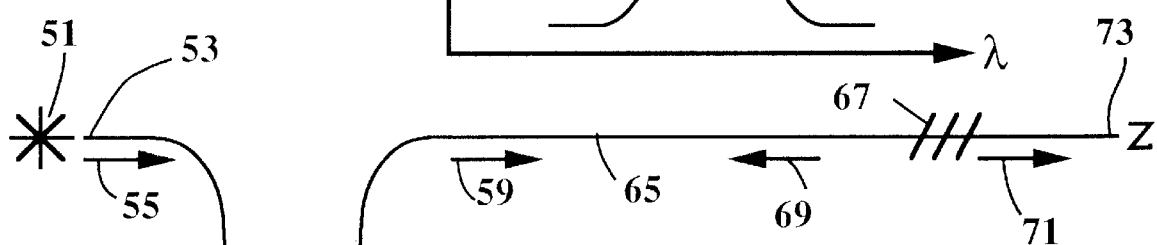
FIG. 2 is an illustration of a single element fiber grating sensor system using a chirped fiber grating and a ratiometric configuration to support high speed demodulation.

FIG. 2 illustrates a prior art high speed fiber grating demodulation system based on using a ratiometric configuration with a fiber grating filter. The usage of a fiber grating to measure fiber grating sensor wavelength shifts if described by E. Udd and T. Clark in U.S. Pat. No. 5,380,995. In the case of the configuration of FIG. 2, light from a source 51 is coupled into a fiber end 53 and directed as light beam 55 to the central fiber beamsplitter 57. The light beam 55 is split into the light beams 59 and 61. The light beam 61 is directed toward the terminated end 63 which is designed to minimize back reflection and exits the system. The light beam 59 propagates down the fiber 65 and a portion of it 69 reflects off the fiber grating 67 while another portion 71 continues to propagate down the fiber 65 eventually reaching the terminated end 73 and exiting the system. The reflected light beam 69 returns to the central fiber beamsplitter 57 and a portion of it is split into the light beam 73 which propagates down the optical fiber 75 to the ratiometric beamsplitter 77. The light beam 73 splits at the beamsplitter 77 into the light beams 79 and 81. The light beam 79 propagates down the fiber lead 83 and hits the reference detector 85. The light beam 81 propagates through a chirped fiber grating filter 87 before reaching the detector 89. The chirped fiber grating filter 87 is designed to have a transmission curve that may be linear. In the case where it is linear having a minimum transmission at one end of the spectral band of interest and a maximum at the other the wavelength of the fiber grating 67 can be measured by simply taking the ratio of the outputs from the detectors 85 and 87.

Figure 3:
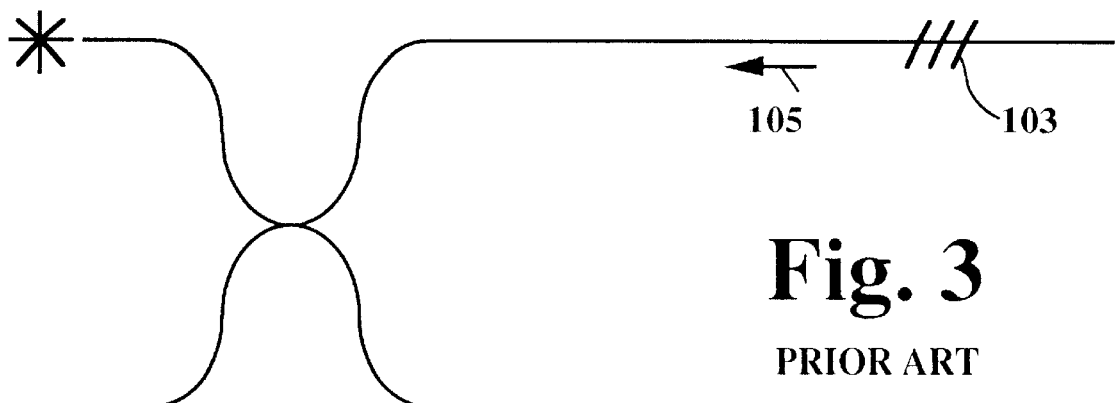
FIG. 3 is an illustration of a single element fiber grating sensor system using an overcoupled coupler and a ratiometric configuration to support high speed demodulation.

FIG. 3 shows a prior art ratiometric fiber grating sensor demodulator based on the usage of an overcoupled coupler 101. As the fiber grating 103 elongates or compresses due to strain or temperature its reflected spectral profile 105 shifts. When a portion of this reflected spectral profile 107 reaches the overcoupled coupler 101 it is split into the two output legs 109 and 111 as the light beams 113 and 115. The ratio of the output of the detectors 117 and 119 can then be used to measure the wavelength of the reflected light beam 105 and used to measure strain or temperature changes associated with the fiber grating 103. An overcoupled ratiometric system is described by E. Udd et al in "Tension and Compression Measurements in Composite Utility Poles Using Fiber Optic Grating Sensors", Proceedings of SPIE, Vol. 2574, p.14, 1995.

Figure 4:
FIG. 4 is an illustration of a single element fiber grating sensor system using a Mach-Zehnder interferometer and a ratiometric configuration to support high speed demodulation.
Figure 4:
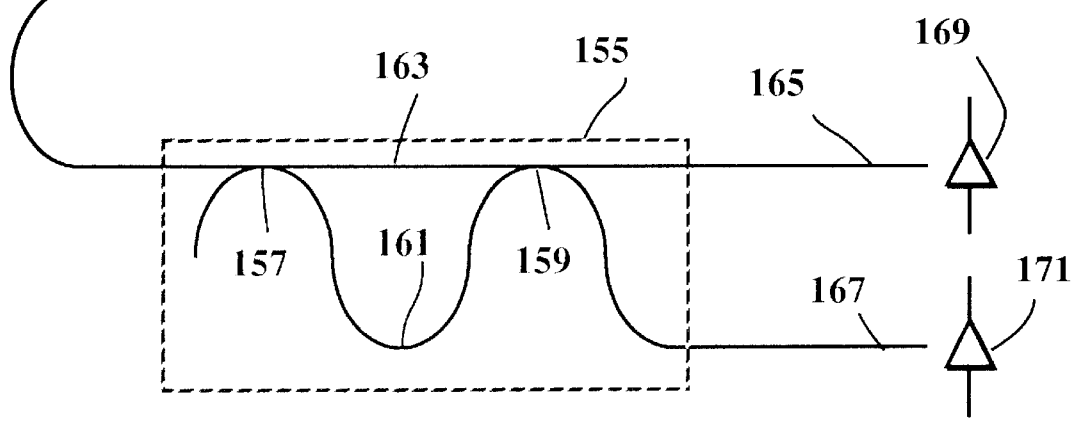

FIG. 4 shows a prior art ratiometric based on the usage of a Mach-Zehnder interferometer. This system and a similar one based on a Michelson interferometer are described by A. D. Kersey and T. A. Berkoff in U.S. Pat. No. 5,361,130 issued Nov. 1, 1994. Here the reflected spectra 153 from the fiber grating 151 is directed back to the Mach-Zehnder interferometer 155 as the light beam 157. The Mach-Zehnder interferometer 155 consists of the beamsplitters 157 and 159 with two fiber optic legs 161 and 163. The lengths of 161 and 163 are slightly different so that as the wavelength of the light beam 157 changes the amplitude of the light in the two output legs 165 and 167 of the Mach-Zehnder interferometer 155 varies. The output of the detectors 169 and 171 can be ratioed to measure the wavelength.

One of the advantages of the demodulator systems associated with FIGS. 2, 3 and 4 is that they can all be configured to support very high speeds. The chirped fiber grating system of FIG. 2 has been commercialized by Blue Road Research and is used to support measurements up to 10 kHz. A faster version that would support speeds up to 100 MHz is under development with an initial target of 3 MHz. The basic configuration is the same for both systems and the only differences involve changes to the support electronic circuits components and layout. The overcoupled coupler and Mach-Zehnder configurations are not widely used for slowly varying strain and temperature measurements because of thermal stability issues. The Mach-Zehnder approach offers the potential for improvements in this area and it can and has been used to support acoustic signal measurements.

Figure 5:
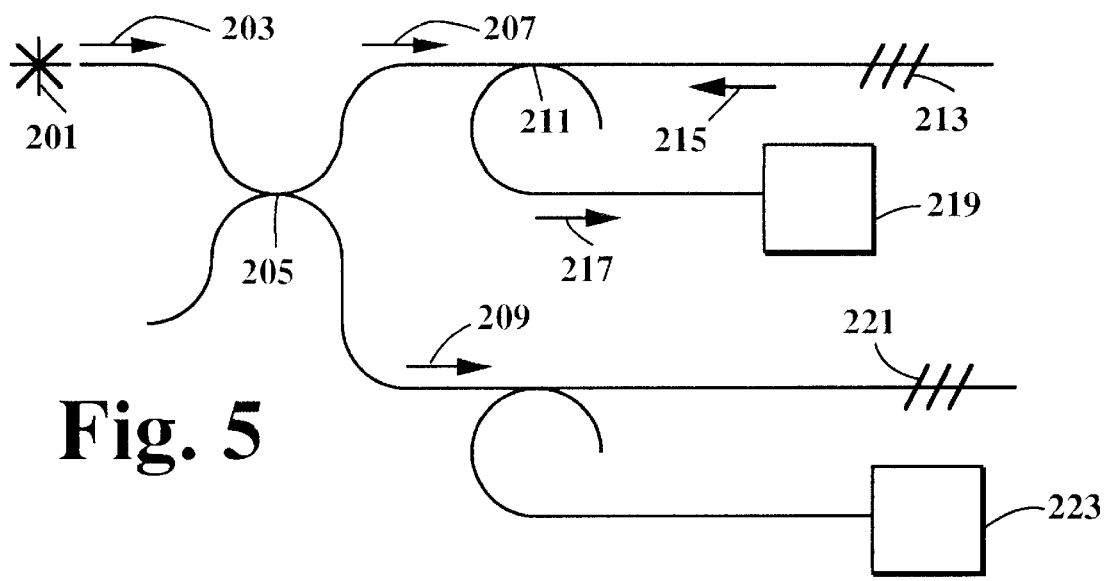
FIG. 5 is a diagram showing how two lines of fiber gratings can be supported by ratiometric fiber grating demodulation systems.

For many applications it would be highly desirable to have a low cost means to multiplex these ratiometric configurations. FIG. 5 shows an approach using both fiber lines associated with a fiber beamsplitter. A light source 201 is used to couple the light beam 203 which is directed toward the central fiber beamsplitter 205 which splits the light beam 203 into the two light beams 207 and 209. The light beam 207 passes the output beamsplitter 211 and a portion of it 215 reflects off the fiber grating sensor 213. A portion of the light beam 215 is split by the beamsplitter 211 into the light beam 217 which is directed to the ratiometric detection circuit 219. The ratiometric detection circuit could be for example a chirped fiber grating system similar to that shown in FIG. 2, an overcoupled coupler system similar to FIG. 3 or a Mach-Zehnder based system similar to FIG. 4. The ratiometric detection circuit 223 is used to monitor the output wavelength of the fiber grating sensor 221 in a similar manner.

Figure 6:
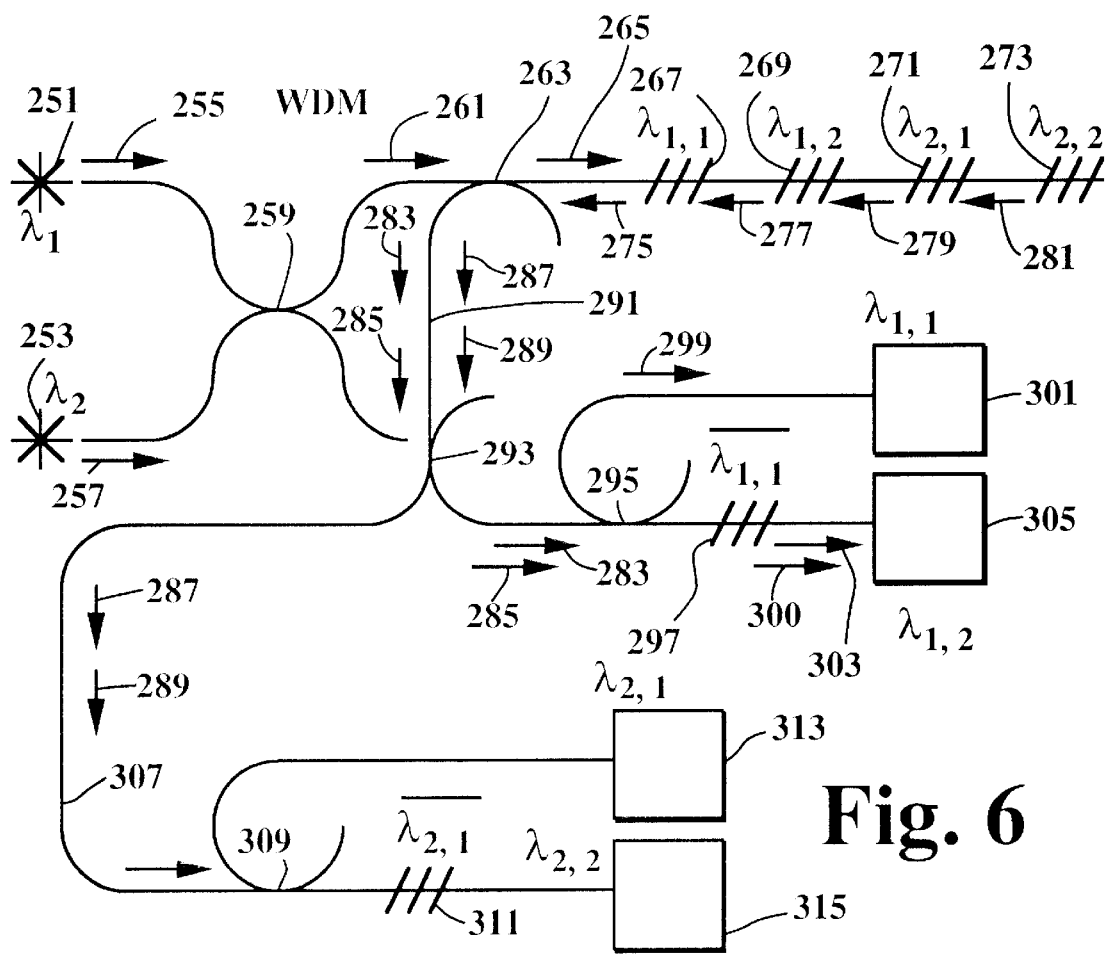
FIG. 6 is a block diagram showing how several fiber grating sensors may be multiplexed in a single fiber line using wavelength division multiplexing elements and fiber grating reflective filters.

In general it is highly desirable to multiplex more than one fiber grating along a single fiber line. FIG. 6 shows a system where a series of fiber gratings may be multiplexed and supported along a single fiber line using ratiometric detection circuits. The light sources 251 and 253 that may be broadband light emitting diodes emit beams of light 255 and 257 at $\lambda_1$ and $\lambda_2$ respectively that are combined by the wavelength division multiplexing element 259 into the light beam 261 that is directed through the central beamsplitter 263.

A portion of the light beam 261 is split into the light beam 265 that is directed to the series of fiber grating 267, 269, 271 and 273 that are centered at wavelengths $\lambda_{1,1}$, $\lambda_{1,2}$, $\lambda_{2,1}$ and $\lambda_{2,2}$ respectively. The fiber gratings 267 and 269 centered at $\lambda_{1,1}$, and $\lambda_{1,2}$ within the wavelength band illuminated by the light source 251 operating in the region of $\lambda_1$. The fiber gratings 271 and 273 are centered at $\lambda_{2,1}$ and $\lambda_{2,2}$ within the wavelength band illuminated by the light source 257 operating in the region of $\lambda_2$. A portion of the light beam 265 is reflected by the fiber grating 267 as the light beam 275, by the fiber grating 269 as the light beam 277, by the fiber grating 271 as the light beam 279 and by the fiber grating 273 as the light beam 281. The light beams 275, 277, 279 and 281 return to the central fiber beamsplitter 263 and are split. The light beams 283, 285, 287 and 289 are the portions of the light beams 275, 277, 279 and 281 directed down the fiber leg 291 to the wavelength division multiplexing element 293. The light beams 283 and 285 at wavelengths $\lambda_{1,1}$, and $\lambda_{1,2}$ are directed by the element 293 to the output beamsplitter 295 and the spectrally flat fiber grating reflective filter centered about $\lambda_{1,1}$ 297. A portion 300 of the light beam 283 is reflected by the reflective grating filter 297 back to the beamsplitter element 295. A portion of the light beam 300 is split off into the light beam 299 and directed onto the ratiometric system 301 that might be based on a chirped fiber grating, overcoupled coupler or Mach-Zehnder interferometer that is used to read out at high speed the changes in wavelength of the fiber grating 267. The light beam 285 passes through the beamsplitter 295 and a portion 303 is split and directed through the element 297 and onto the ratiometric output detector 305 that measures wavelength changes associated with the fiber grating 269. The light beams 287 and 289 are directed toward the leg 307 of the system and portions of these beams pass through the beamsplitter and onto the reflective fiber grating filter 311 which is designed to reflect light associated with the fiber grating 271 toward the ratiometric demodulator 313. A portion of the light beam 289 associated with the fiber grating 273 passes through the fiber grating filter 311 and its wavelength is measured by the ratiometric demodulator 315. In this manner a series of fiber grating sensors 267, 269, 271 and 273 can be demodulated at high speed along a single fiber line.

Figure 7:
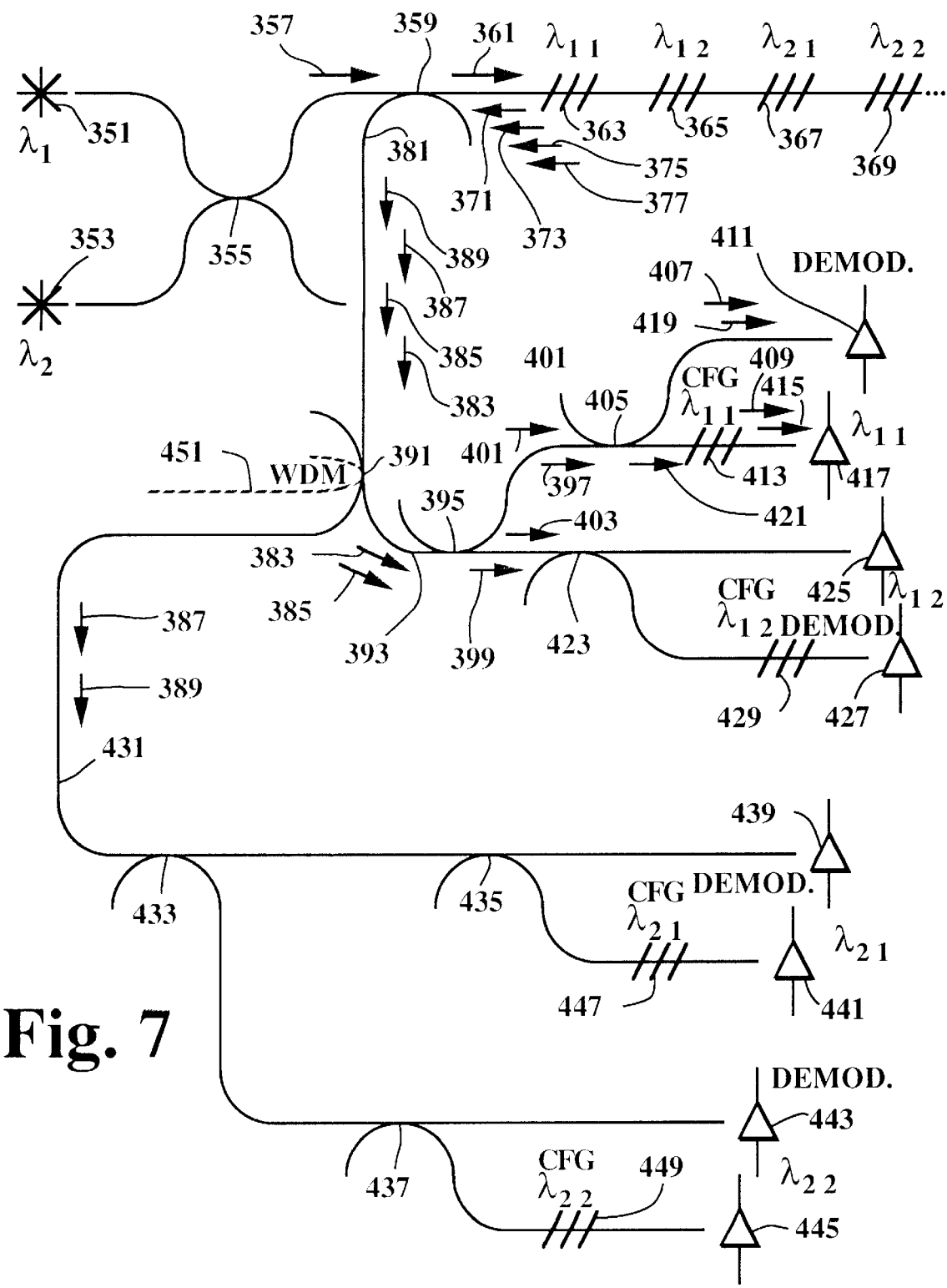
FIG. 7 is an illustration of multiplexing several fiber grating sensors in a single line using chirped fiber grating filters in a ratiometric demodulation configuration in combination with wavelength division multiplexing elements.

FIG. 7 shows a system configured with many common features similar to FIG. 6. Light sources 351 and 353 in combination with the wavelength division multiplexing element 355 are used to generate a broadband light beam 357 around the wavelengths $\lambda_1$ and $\lambda_2$. The light beam 357 is split by the central beamsplitter 359 and the broadband light beam 361 is directed to the fiber grating sensors 363, 365, 367 and 369 centered about the wavelengths $\lambda_{1,1}$, $\lambda_{1,2}$, $\lambda_{2,1}$ and $\lambda_{2,2}$ respectively. A portion of the light beam 361 is reflected by each of the fiber gratings 363, 365, 367 and 367 into the light beams 371, 373, 375 and 377. The light beams 371, 373, 375 and 377 are directed back to the central beamsplitter 359 and portions are split off into the fiber leg 379 as the light beams 383, 385, 387 and 389. The light beams 383 and 385 are directed by the wavelength division multiplexing element 391 into the fiber leg 393. The light beams 383 and 385 are then split by the beamsplitter 395. The light beam 383 is split into the light beams 397 and 399. The light beam 385 is split into the light beams 401 and 403. The light beam 397 enters the beamsplitter 405 which may be designed to split light in the region of $\lambda_1$ approximately equally. This results in the light beams 407 and 409. Light beam 407 passes directly to the output detector 411 without being filtered. Light beam 409 passes through the chirped fiber grating filter 413 which is designed to strongly filter around the wavelength $\lambda_{1,1}$. The filtered light beam 415 then passes onto the detector 417. The ratio of the outputs of detectors 411 and 417 can be ratioed to determine wavelength on the basis of light beams 407 and 415. There is an offset caused by the action of light beam 401 which splits at the beamsplitter 405 into the light beams 419 and 421. The light beam 419 passes directly to the detector 411 and the light beam 421 passes directly to the detector 417 without being affected by the chirped fiber grating filter 413 which does not act as a filter in the $\lambda_{1,2}$ wavelength region. The light beams 399 and 403 directed toward the beamsplitter 423 act in a similar fashion, being split and directed toward the output detectors 425 and 427. In this case the portions of the light beam 399 that are split act to form an offset on the detectors 425 and 427. The light beams split from 403 when they hit the detectors 425 and 427 have a ratio indicative of wavelength shift due to the action of the chirped fiber grating filter 429 centered about the $\lambda_{1,2}$ wavelength region. The light beams 387 and 389 that are directed by the wavelength division multiplexing element 391 into the fiber leg 431 are split in an analogous manner by the beamsplitters 433, 435 and 437 onto the detectors 439, 441, 443 and 445. The portions of the light beams associated with 387 generate a ratio through the action of the chirped fiber grating 447 which is centered around the wavelength region $\lambda_{2,1}$ on the output detectors 439 and 441 indicative of wavelength change while those associated with 389 generate an offset. Similarly the portions of the light beam 389 generate a ratio change indicative of wavelength change on the detectors 443 and 445 through the action of the chirped fiber grating filter 449 centered around the wavelength $\lambda_{2,2}$ while those associated with 387 produce an offset on the detectors 443 and 445. It is also possible for the wavelength division multiplexing element 391 to support additional wavelength bands via additional legs such as 451. This in turn would support more gratings. It is also possible that the chirped fiber grating filters could be designed so that more gratings could be supported. As an example suppose that the light source 351 is an edge light emitting diode with a full width half maximum spectrum of 80 nm. For a fiber grating strain sensor the conversion between wavelength change at 1300 nm is approximately 10 microstrain for a wavelength shift of 0.01 nm. If each fiber grating strain sensor must support a range of 10,000 microstrain then eight 10 nm fiber grating filters could be used to support eight fiber grating sensors. Allowing for some margin between filters to avoid overlapping spectra would slightly reduce this range to perhaps eight or nine sensors. By using a second edge light emitting diode at 1550 nm with similar characteristics an additional eight or nine sensors could be supported. Because this system relies exclusively on wavelength division multiplexing extremely high speeds and bandwidths can be supported as each fiber grating sensor is monitored continuously by a high speed ratiometric detection system.

Figure 8:
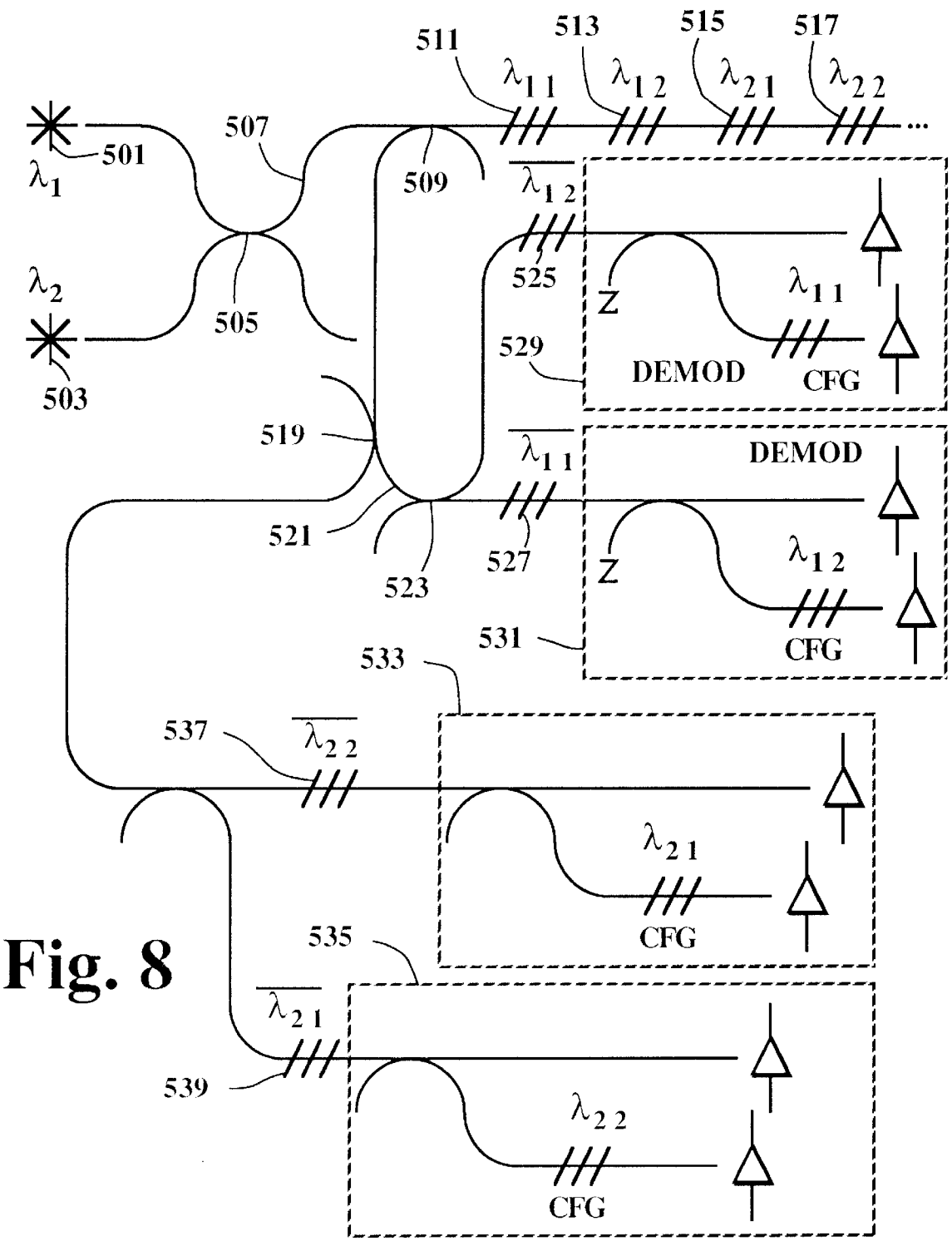
FIG. 8 is a diagram of a demodulation system supporting multiplexed fiber grating sensors in a single line that uses fiber grating blocking filters in front of ratiometric demodulation systems to improve performance. The ratiometric demodulators could be based on chirped fiber gratings, Mach-Zehnder or overcoupled coupler configurations.

FIG. 8 is a block diagram illustrating a high speed ratiometric system using fiber grating blocking filters. In this case light beams at the wavelengths $\lambda_1$ and $\lambda_2$ are generated by the light sources 501 and 503 and combined by the wavelength division multiplexing element 505. In general many more than two light sources can be combined in this fashion using commercially available light sources and wavelength division multiplexing elements. The combined light beam 507 is used in combination with the beamsplitter 509 to illuminate a series of fiber gratings 511, 513, 515 and 517 centered about the wavelengths $\lambda_{1,1}$, $\lambda_{1,2}$, $\lambda_{2,1}$ and $\lambda_{2,2}$ respectively. These fiber gratings reflect light beams that are indicative of their state of strain and temperature that are directed into a wavelength division multiplexing element 519 through the action of the central beamsplitter 509. The element 519 directs the light reflected from the fiber gratings 511 and 513 centered about the wavelengths $\lambda_1$ and directs it via the leg 521 to the beamsplitter 523. The light beams split by 523 are directed into the fiber grating blocking filters 525 and 527 designed to reject light in the $\lambda_{1,2}$, $\lambda_{1,1}$ bands respectively. The ratiometric optical detection circuits 529 and 531 are designed to demodulate the $\lambda_{1,1}$, $\lambda_{1,2}$ bands respectively. These circuits 529 and 531 could be based on chirped fiber gratings, overcoupled couplers or Mach-Zehnder based systems. The ratiometric optical detection circuits 533 and 535 are designed to demodulate wavelengths around $\lambda_{2,1}$ and $\lambda_{2,2}$ respectively with the support of fiber grating blocking filters 537 and 539 at wavelengths $\lambda_{2,2}$ and $\lambda_{2,1}$ respectively. This system avoids offsets associated with FIG. 7 by using blocking filters that also allow general ratiometric detection systems to be used.

The systems described thus far can be used to support multiple fibers in line and extremely high demodulation speeds. Each ratiometric demodulation system can be used to support only one fiber grating sensor element which in turn would usually be used to measure axial strain or temperature. For cases where fiber grating strain sensors are attached to the surface of a structure or embedded in tubes that shield the fiber grating from transverse forces this can be a reasonable approximation. In certain important cases axial strain can also predominate for embedded fiber grating sensors that are near the surface of an embedded structure. For the more general case transverse strain components become important and their measurement can be critical for determination of such key structural components as residual strain.

Figure 9:
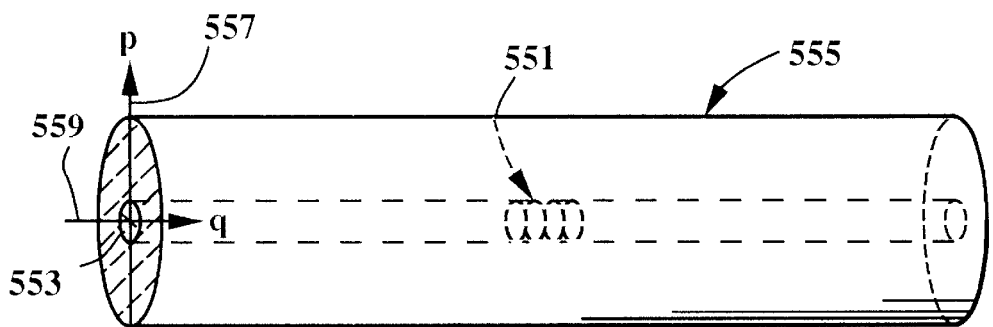
FIG. 9 is a diagram of a multiaxis fiber grating sensor based on writing a single fiber grating onto birefringent optical fiber.
Figure 10:
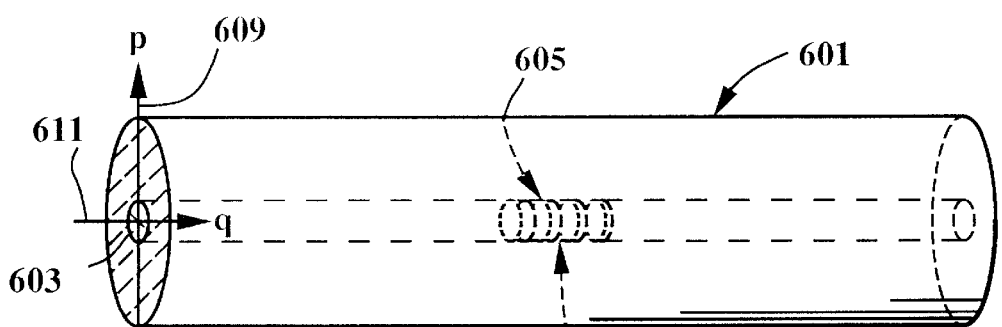
FIG. 10 is a diagram of a multiaxis fiber sensor based on writing two fiber gratings at different wavelengths onto birefringent optical fiber.
Figure 11A:
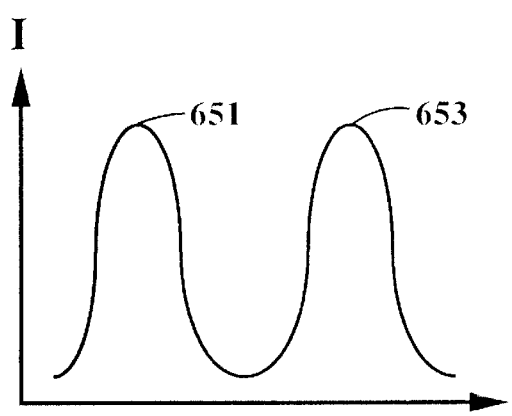
FIG. 11 is an illustration of the change in spectral profile that results when a fiber grating written onto birefringent optical fiber is subject to axial strain or temperature changes.
Figure 11B:
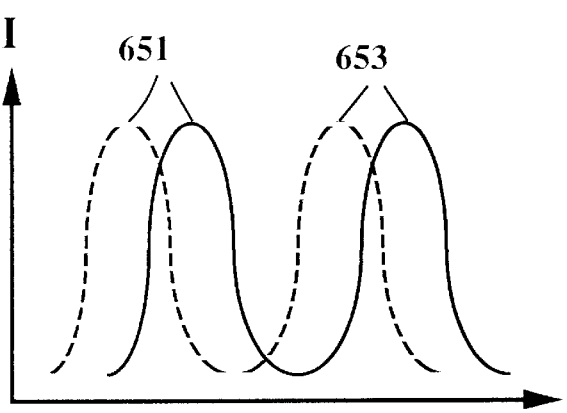
Figure 11C:
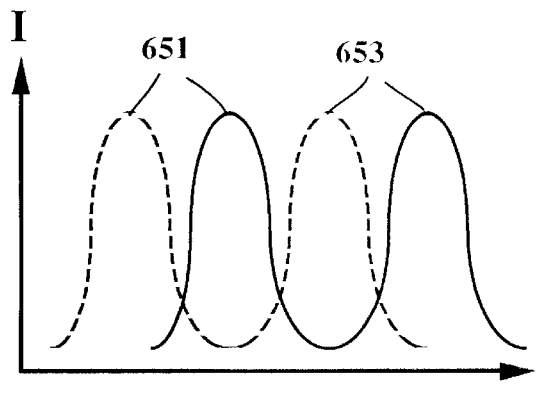
Figure 12A:
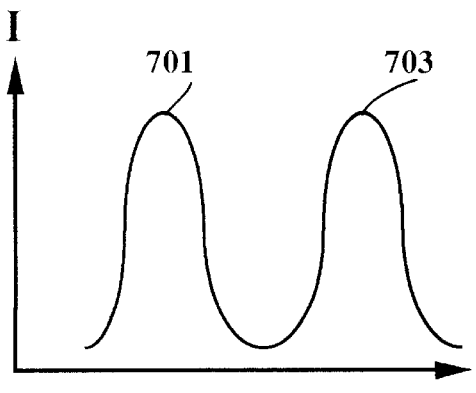
FIG. 12 is a diagram illustrating the change in spectral profile that results when a fiber grating written into birefringent optical fiber is subject to transverse strain changes along one of its birefringent optical axes.
Figure 12B:
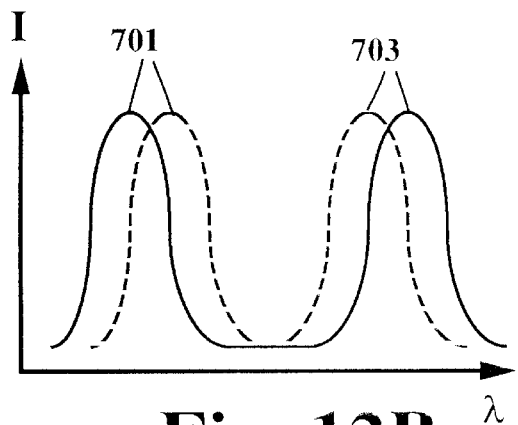
Figure 12C:
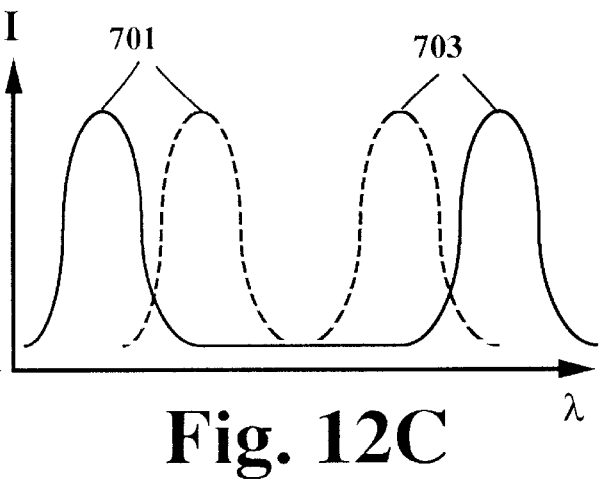

FIG. 9 shows a single fiber grating 551 written into the core 553 of a birefringent optical fiber 555. The principal axes 557 and 559 which for clarity shall be designated the p and q axis have different indices of refraction. FIG. 10 shows a birefringent optical fiber 601 with a core 603 and two fiber gratings 605 and 607 at two different wavelengths written onto it. The principal axes 609 and 611 will again be designated the p and q axes. The usage of fiber gratings written into birefringent fiber to measure transverse and axial strain is described by Eric Udd in U.S. Pat. No. 5,591,965, Jan. 7, 1997, U.S. Pat. No. 5,646,401, issued Jul. 8, 1997 and U.S. patent application Ser. No. 08/707,861 filed Sep. 9, 1996. FIG. 11a shows the dual spectral peak structure 651 and 653 associated with writing a single fiber grating onto birefringent optical fiber. When the birefringent fiber is subject to axial strain or temperature the double peak structure shifts in wavelength as in FIGS. 11b and 11c. When the birefringent fiber is subject to transverse strain the spectral separation of the dual spectral peaks 703 and 705 of FIG. 12 changes. The peaks will move apart or together depending on whether strain is applied to the higher or lower index of refraction index. The case of spectral spreading as strain increases the difference in the index of refraction between the p and q axes is shown in FIG. 12.

Figure 13:
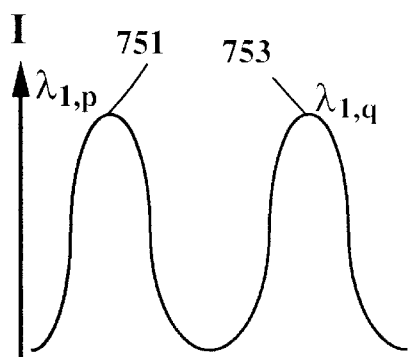
FIG. 13 is a diagram illustrating the four reflective spectral peaks that result when dual overlaid fiber gratings at separate wavelengths are written onto birefringent optical fiber.

For the general case of dual overlaid fiber gratings of two different wavelengths written into birefringent optical fiber there are four major spectral peaks as shown in FIG. 13. The first wavelength has two peaks associated with it along the p and q axes 751 and 753 while the second wavelength has two peaks associated with the p and q axes 757 and 759. By monitoring the spectral shifts of all four peaks and relating them to the three principal axes of strain and temperature a system of four equations in four unknowns is established. Solving these equations enables three axes of strain and temperature to be monitored. Commercially available polarization preserving fibers available from 3M and Fibercore have been used in conjunction with dual overlaid fiber gratings to implement multiparameter fiber gratings.

Experimental results have been used to determine optimum demodulation procedures for high speed. Dual overlaid fiber gratings have been written at 1300 and 1550 nm, respectively onto polarization maintaining fiber commercially available from (a) 3M and (b) Fibercore. The relationship between the three strain components (axial strain, $\epsilon_1$, and transverse strains, $\epsilon_2$, and $\epsilon_3$), temperature, $\Delta T$, and the corresponding wavelength shifts in the four peak positions ($\Delta\lambda_1$, $\Delta\lambda_2$, $\Delta\lambda_3$ and $\Delta\lambda_4$) can be expressed in the form of the following matrix equation:

$$\begin{bmatrix} \Delta\lambda_{1p} \\ \Delta\lambda_{1q} \\ \Delta\lambda_{2p} \\ \Delta\lambda_{2q} \end{bmatrix} = \begin{bmatrix} K_{11} & K_{12} & K_{13} & K_{14} \\ K_{21} & K_{22} & K_{23} & K_{24} \\ K_{31} & K_{32} & K_{33} & K_{34} \\ K_{41} & K_{42} & K_{43} & K_{44} \end{bmatrix} \begin{bmatrix} \varepsilon_1 \\ \varepsilon_2 \\ \varepsilon_3 \\ \Delta T \end{bmatrix} \quad (1)$$

The 4×4 matrix in equation (1), which will be called 'K-matrix', has been experimentally determined for both the 3M fiber and Fibercore fiber and is shown in FIG. 14. FIG. 15 shows the maximum estimated error when using information from less than four peaks as well as from all four peaks to measure axial strain and temperature based on a 1 pm wavelength resolution of the peak locations for (a) the 3M fiber and (b) the Fibercore fiber. Note that the highest accuracy for both axial strain measurement and temperature measurement is obtained by using the wavelength 1 peak for the q axis and the wavelength 2 peak for the q axis for the 3M fiber and the wavelength 1 peak for the q axis and the wavelength 2 peak for the p axis for the Fibercore fiber. Similar accuracy is obtained for sensor combination 1q+2p for the 3M fiber and 2p+2q for the Fibercore fiber. FIG. 16 shows that 3 peaks may be monitored to achieve accuracy similar to that of 4 for measuring three independent strain components.

In particular, the 1p,q+2q and 1q+2p,q combinations are preferred for the 3M fiber and the 1p,q+2p and 1p+2p,q combinations are preferred for the Fibercore fiber. FIG. 17 shows the case of axial and equal transverse strain, which would correspond to uniform pressure loading. The double peak structure generated by a single wavelength produces results that are comparable to using all four peaks or to using the optimum two sensor combinations which are 1q+2p for the 3M fiber and 1p+2q for the Fibercore fiber.

Figure 18:
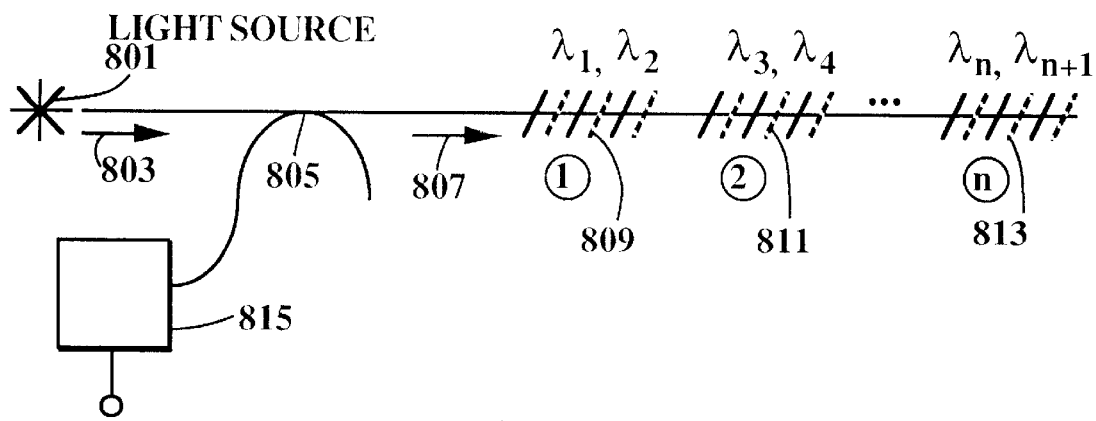
FIG. 18 shows a block diagram of a multiparameter fiber grating sensor system configured to support series of multiparameter fiber grating sensors in a single line with processing options to increase overall speed.

FIG. 18 shows how these properties could be used to reduce the processing time associated with a series of fiber grating sensors multiplexed along a single fiber line. A light source 801 is used to generate a light beam 803 that passes through a beamsplitter 805 that directs a portion 807 of the light beam 805 to a series of dual overlaid fiber gratings 809, 811 and 813 written onto birefringent optical fiber. Each of these dual overlaid fiber gratings 809, 811 and 813 reflects a series of four spectral peaks back through the beamsplitter 805 and onto the spectral peak processor 815 that might be a scanning fiber etalon or acoustooptic tunable filter based system. The processor is set to process the minimal number of peaks from each of the n fiber gratings with acceptably accurate results. As an example two peaks might be processed from the grating 809 to measure axial strain and temperature, three from grating 811 to measure three axes of strain and two from the nth grating 813 to measure pressure. In this manner a variety of environmental effects can be measured by along a single optical fiber line with minimal processing time.

Figure 19:
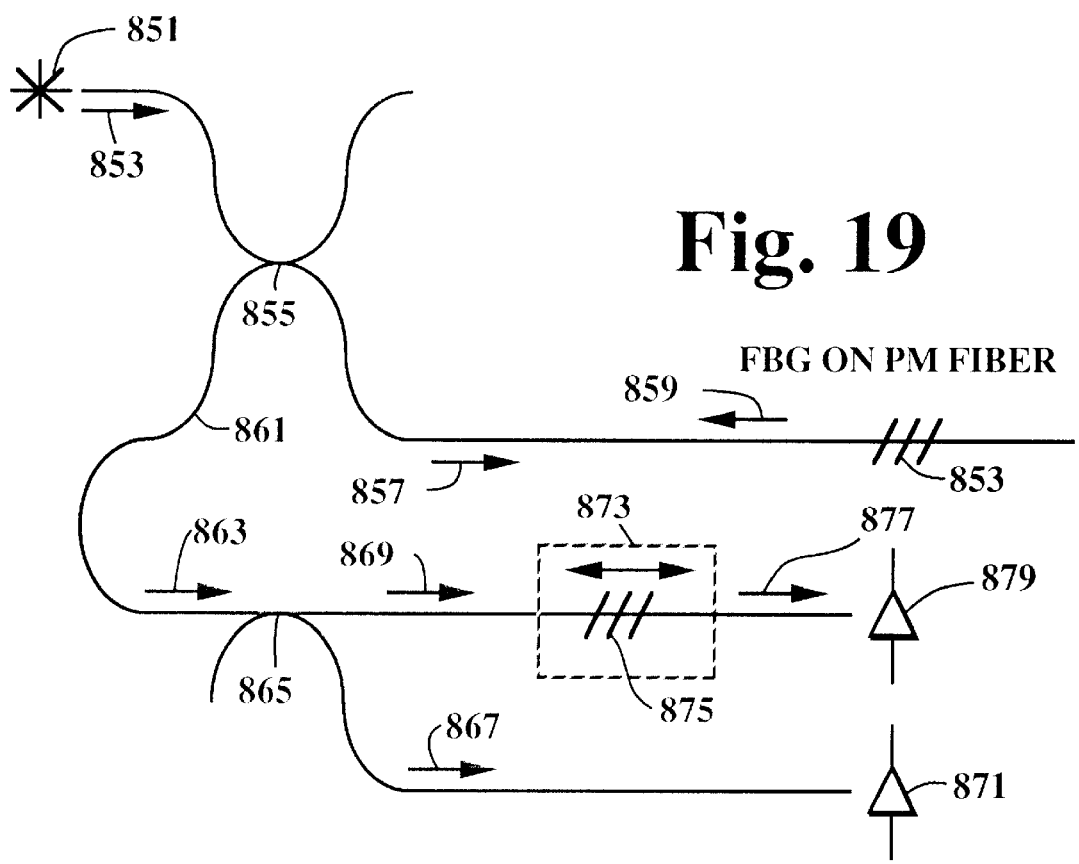
FIG. 19 is an illustration of a high speed demodulation system configured for measurement of transverse strain.

In some case it may be desirable to measure transverse strain at extremely high speed on the order of MHz or higher. This might be the case for example with ballistic or rocket motor tests. FIG. 19 shows a basic system that could be used to support these measurements. In this case a light source 851 generates a light beam 853 that propagates to the central fiber beamsplitter 855 and a portion 857 of the light beam 853 is directed to a fiber grating 853 written onto birefringent optical fiber. The resulting double spectral peak reflection 859 is directed back to the central beamsplitter 855 and a portion of it is directed by the beamsplitter 855 into the fiber leg 861 as the light beam 863. The light beam 863 is then split by the beamsplitter 865 into the light beams 867 and 869. The light beam 867 passes directly onto the detector 871 and serves as a reference. The light beam 869 passes through a variable spectral filter 873 which might be a fiber grating 875 that is physically stretched, a tunable fiber etalon or an acoustooptic tunable filter. The portion 877 of the light beam 869 that passes through the variable spectral filter 871 then falls onto the output detector 879.

Figures 20A, 20B:
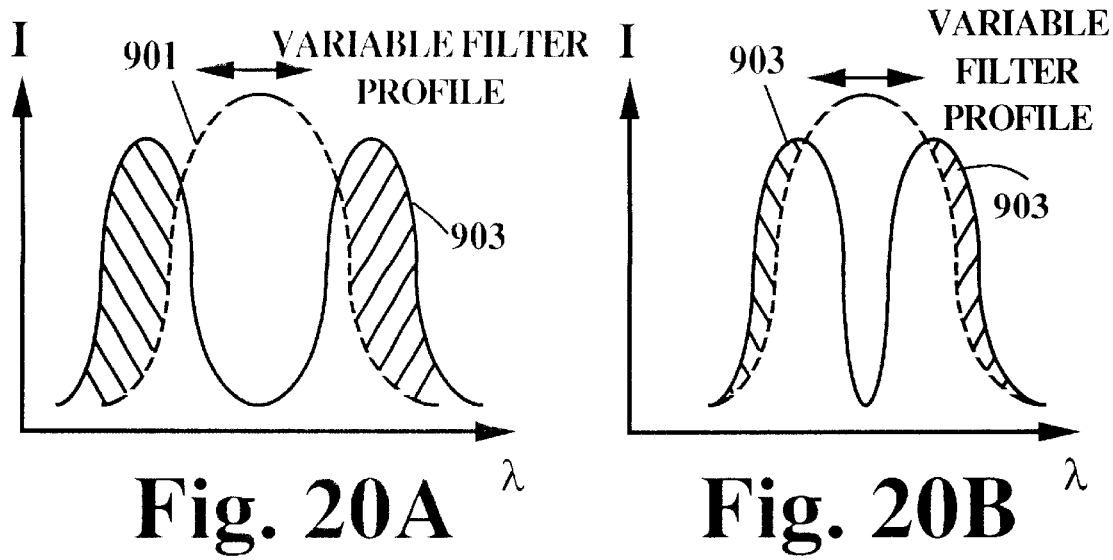
FIG. 20a is a diagram showing how a variable filter spectral profile may be positioned between the dual spectral peaks of a fiber grating written into birefringent optical fiber.
FIG. 20b illustrates how transverse strain modulating peak to peak spectral separation results in a net amplitude change in light propagating past the variable filter spectral profile. Variable modulation of the position of spectral peak profile can be used to accurately position the filter between the dual peaks.

Referring to FIG. 20a before high speed operation to measure transverse strain the variable spectral filter 871 profile 901 would be adjusted so that it lies in between the double peak structure spectral profile 903 of the fiber grating written on birefringent fiber 853. When the fiber grating is subject to transverse strain the separation between the double peaks 903 will shift as in FIG. 20b and the transmission through the filter 871 will vary. High speed demodulation would then be accomplished by taking the ratio of the outputs of the detectors 871 and 879.

Figure 21:
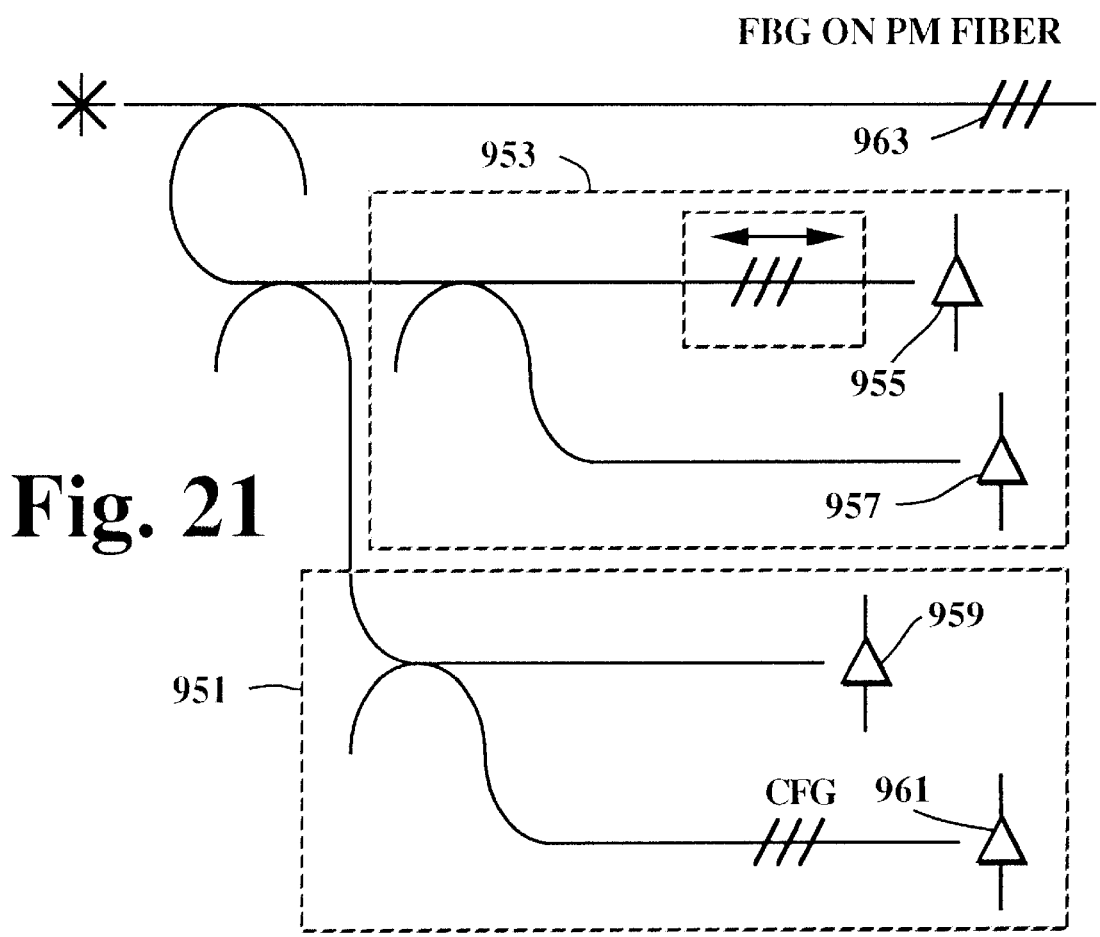
FIG. 21 is a block diagram of a ratiometric fiber grating demodulation system configured to measure transverse strain and correct for longitudinal strain induced spectral changes.

In general a fiber grating subject to transverse strain may also experience axial strain at high speeds. FIG. 21 shows a demodulation system similar to that of FIG. 19. Here a second ratiometric fiber grating demodulator 951 that might be a chirped fiber grating based system, an overcoupled coupler or a Mach-Zehnder is used to monitor axial strain and used to compensate the ratiometric fiber grating demodulator based on a variable spectral filter 953. That is the ratio between the outputs of the detectors 955 and 957 will contain information about both transverse and axial strain. The ratio output of the detectors 959 and 961 will contain information principally of axial elongation of the fiber due to strain or temperature. This output can be used to compensate the ratio outputs of detectors 955 and 957 for these effects so that a more direct measurement of high speed transverse strain may be made.

Several in line fiber gratings written onto birefringent fiber such as polarization preserving fiber may be multiplexed to measure rapidly varying transverse strain or pressure by combining the techniques described in association with FIGS. 19 through 21 with the multiplexing methods of FIGS. 6 through 8. These combinations can be simplified greatly by judicious selection of the minimum number of spectral peaks that must be tracked to give optimal results. FIGS. 15 through 17 can be used to optimize these selections for the cases of simultaneously measurement of axial strain and temperature, three axes of strain and the important case of axial strain and two equal transverse strains. The latter case applies to direct pressure measurements.

Thus there has been shown and described novel high speed fiber grating demodulation systems which fulfill all the objects and advantages sought therefor. Many changes, modifications, variations and applications of the subject invention will become apparent to those skilled in the art after consideration of the specification and accompanying drawings. All such changes, modifications, alterations and other uses and applications which do not depart from the spirit and scope of the invention are deemed to be covered by the invention which is limited only by the claims that follow:

What is claimed is:

1. A fiber optic system capable of high speed measurement of one or more physical occurances including:
   a first light source for producing a first spectrum of light with at least first and second spectral portions;
   a second light source for producing a second spectrum of light with at least third and fourth spectral portions;
   a first beamsplitter connected to receive the first and second spectrums and combine them into a first light beam;
   at least a first fiber grating for reflecting the first spectral portion, a second fiber grating for reflecting the second spectral portion, a third fiber grating for reflecting the third spectral portion, and a fourth fiber grating for reflecting the fourth spectral portion, at least one of said fiber gratings being affected by a physical occurance, said first, second, third, and fourth fiber gratings being optically connected to have spectral portions of the first light beam reflected thereby as first, second, third, and fourth spectral portion light beams; and
   ratiometric means to receive at least one of the first, second, third, and fourth spectral portion light beams and demodulate any physical occurance on said first, second, third, or fourth fiber grating.

2. The fiber optic system as defined in claim 1 wherein said ratiometric means include:
   a first ratiometric system;
   a second ratiometric system; and
   a fifth fiber grating exposed to the first and second spectral portion light beams and positioned to reflect the first spectral portion to said first ratiometric system and to transmit the second spectral portion to said second ratiometric system.

3. The fiber optic system as defined in claim 1 wherein said ratiometric means include:
   a wavelength division multiplexer positioned to split the first and second spectral portion light beams from the third and fourth spectral portion light beams;
   a first ratiometric system;
   a second ratiometric system;
   a third ratiometric system;
   a fourth ratiometric system;
   a fifth fiber grating positioned with respect to said wavelength division multiplexer to be exposed to the first and second spectral portion light beams and positioned to reflect the first spectral portion to said first ratiometric system and to transmit the second spectral portion to said second ratiometric system; and
   a sixth fiber grating positioned with respect to said wavelength division multiplexer to be exposed to the third and fourth spectral portion light beams and positioned to reflect the third spectral portion to said third ratiometric system and to transmit the fourth spectral portion to said fourth ratiometric system.

4. The fiber optic system as defined in claim 1 wherein ratiometric means include:
   a first light detector;
   a chirped fiber grating constructed to reflect the first spectral portion light beam;
   a second beamsplitter connected to receive the first spectral portion light beam and split it to said first light detector and said chirped fiber grating; and
   a second detector positioned to receive light transmitted through said chirped fiber grating.

5. The fiber optic system as defined in claim 1 wherein ratiometric means further include:
   a first light detector;
   a fifth fiber grating constructed to reflect the second spectral portion light beam;
   a chirped grating constructed to reflect the first spectral portion light beam;
   a second beamsplitter connected to receive the light transmitted by said fifth fiber grating and split it to said first light detector and said chirped fiber grating; and
   a second detector positioned to receive light transmitted through said chirped fiber grating.

6. The fiber optic system as defined in claim 1 wherein the physical occurances applied to said first fiber grating are axial strain and transverse strain said ratiometric means further include:
   a first light detector;
   a variable fiber grating constructed to variably reflect the first spectral portion light beam while transmitting any remaining light of the first spectral portion to said first light detector;
   a second light detector positioned to detect the first spectral portion;
   a chirped grating constructed to reflect the first spectral portion light beam; and
   a second detector positioned to receive any remaining light of the first spectral portion light beam transmitted through said chirped fiber grating.

7. The fiber optic system as defined in claim 1 wherein the physical occurances applied to said first fiber grating are axial strain and transverse strain said ratiometric means further include:
   a first light detector;
   a variable fiber grating constructed to variably reflect the first spectral portion light beam while transmitting any remaining light of the first spectral portion to said first light detector; and
   a second light detector positioned to detect the first spectral portion.

8. A method to determine physical effects including:
   detecting the spectral peaks from a plurality of fiber gratings and produce outputs representative thereof;
   determining the errors associated with the detection of the spectral peaks from the plurality of fiber gratings and thereby determining the errors in the outputs;
   combining outputs having minimum error for selected physical effects into a matrix; and
   solving the matrix for the physical effects.

9. The method as defined in claim 8 wherein at least one the fiber gratings is at least a dual overlaid grating, producing four outputs.

10. The method as defined in claim 8 further including:
    producing light of different wavelengths to impinge on the plurality of fiber gratings; and
    detecting the spectral peaks with ratiometric means.

11. A fiber optic system capable of high speed measurement of one or more physical effects including:
    A first light source for producing a first spectrum of light
    A first beamsplitter connected to receive the first spectrum of light
    At least a first fiber grarting for reflecting light written onto a birefringent optical fiber connected to said first beamsplitter A second beamsplitter connected to said first beamsplitter to receive reflected light from said first fiber grating Ratiometeric means to receive and process the light signal from each of two ends of said second beamsplitter.

12. The fiber optic system as defined in claim 11 wherein said ratiometeric means include A first ratiometeric system consisting of a beamsplitter with one end connected to a variable filter with a spectral envelope that can be positioned between the reflected spectral peaks of said first fiber grating written onto birefringent optical fiber; and A second ratiometeric means.

13. The fiber grating system as defined in claim 12 wherein said second ratiometeric means includes:

A chirped fiber grating.

14. The fiber grating system as defined in claim 12 wherein said second ratiometeric means includes:

An overcoupled beamsplitter.

15. The fiber grating system as defined in claim 12 wherein said second ratiometeric means includes:

A Mach-Zehnder interferometer.

* * * * *